United States Patent [19]

Lotgering et al.

[11] 4,397,796
[45] Aug. 9, 1983

[54] METHOD OF MANUFACTURING AN ANISOTROPIC OXIDIC PERMANENT MAGNET

[75] Inventors: Frederik K. Lotgering; Petrus H. G. M. Vromans, both of Eindhoven, Netherlands

[73] Assignee: U.S. Philips Corporation, New York, N.Y.

[21] Appl. No.: 264,735

[22] Filed: May 18, 1981

[30] Foreign Application Priority Data

May 23, 1980 [NL] Netherlands ................. 8002990

[51] Int. Cl.³ ................. H01F 1/10; H01F 41/02
[52] U.S. Cl. ................. 264/24; 252/62.63; 264/65; 264/67; 264/DIG. 58; 423/594
[58] Field of Search ............ 252/62.63; 423/594, 423/24; 264/63, 65, 67, DIG. 58

[56] References Cited

U.S. PATENT DOCUMENTS 2,955,085  10/1960  Jonker et al. .................. 252/62.63

FOREIGN PATENT DOCUMENTS 2158804  5/1973  Fed. Rep. of Germany ...... 423/594
2549085  5/1976  Fed. Rep. of Germany ...... 423/594
7807537  of 0000  Netherlands .

*Primary Examiner*—Jack Cooper
*Attorney, Agent, or Firm*—Marc D. Schechter

[57] ABSTRACT

In order to obtain a sintered oxidic permanent magnetic material with improved properties, a mixture is prepared which forms a magnet having a composition defined by the formula $MeFe_2^{2+}Fe_{16}^{3+}O_{27}$, where Me is one or more of the metals barium or strontium, optionally partly replaced by clacium and/or lead. A prefired product having a ferrous iron content which corresponds to the stoichiometric ferrous content of the product composition is sintered at a temperature between 1160° and 1250° C. in an atmopshere having such an oxygen concentration that substantially no oxygen exchange takes place between the product and the atmosphere.

4 Claims, No Drawings

METHOD OF MANUFACTURING AN ANISOTROPIC OXIDIC PERMANENT MAGNET

BACKGROUND OF THE INVENTION

The invention relates to a method of manufacturing an anisotropic oxidic permanent magnet having a hexagonal crystal lattice and uniaxial anisotropy. The invention also relates to an anisotropic oxidic permanent magnet manufactured by such a method.

Netherlands Patent Application No. 7,807,537 describes such a method which includes the steps of (a) providing a starting mixture of (i) iron oxide and/or iron compounds which form iron oxide upon heating with (ii) one or more oxides and/or compounds which form the corresponding oxides upon heating of the metals barium, strontium, and lead in quantities which form a magnet having a desired ferrite phase; (b) prefirring the mixture in an oxygen-containing atmosphere having an oxygen a partial pressure related to the prefirring temperature chosen to form a stoichiometric product, (c) grinding the prefired products, (d) shaping the prefired product in the presence of a magnetic field, and (e) sintering the prefired product.

The sintered magnets manufactured by means of this known method comprise several phases in the range from the M to the W ferrite phase. To produce the desired product, a very carefully determined quantity of oxygen, dependent on the firing temperature, is present in the oven atmosphere during prefiring and final sintering. M-ferrite is to be understood to mean herein a ferrite phase having a stoichiometric composition defined by the formula $$MeFe_{12}{}^{3+}O_{19},$$

where Me is Ba, Sr, or Pb, and in which the atomic ratio of Me to iron is equal to 1:12. The easy axis of magnetization of M-ferrite is parallel to the crystallographic c-axis. Permanent magnets comprising this ferrite phase are produced on a large scale, for example, under the trade name "Ferroxdure".

W-ferrite is to be understood to mean a ferrite phase having a stoichiometric composition defined by the formula $$MeA_2{}^{2+}Fe_{16}{}^{3+}O_{27},$$

where Me is Ba, Sr, or Pb and $A^{2+}$ is Fe, Zn, Cu, Ni, Mn, Mg or mixtures hereof. This W-ferrite, in which the atomic ratio of Me to ($A^{2+}$ +$Fe^{3+}$) is 1:18, has a crystal structure which is related to that of M-ferrite. Except for $Co^{2+}$-W-ferrite, the easy axis of magnetization is parallel to the c-axis.

The object of the method described in Netherlands Patent Application No. 7,807,537 is to provide an anisotropic oxidic permanent magnet which, as compared with the known oxidic permanent magnets, has an increased saturation polarization $J_s$ in combination with an acceptable value of the intrinsic coercivity $H_{cJ}$. Although this object appears to be achieved to a certain extent, the totality of the magnetic properties of the resulting permanent magnets may be improved. As moreover the manufacture is based on the idea that during the whole heating and cooling process a chemical equilibrium should be maintained between the gaseous phase and the solid phase by oxygen exchange, a rather complicated method is required which involves heating up, prefiring, final sintering, and cooling in the presence of an oxygen-containing atmosphere having a variable oxygen partial pressure which is continuously adjusted to the firing temperature according to a given logarithmic relationship.

SUMMARY OF THE INVENTION

It is an object of the present invention to provide new routes which lead to a comparatively simple method of manufacturing oxidic permanent magnets which have improved properties.

For that purpose, in the method according to the invention:
(a) the starting mixture forms a W-ferrite phase defined by the formula $MeFe_2{}^{2+}Fe^{3+}{}_{16}O_{27}$, where Me is one or more of the metals barium, strontium and lead, optionally replaced partly by calcium and
(b) sintering takes place at a temperature between 1160° and 1250° C. in a gaseous atmosphere having such an oxygen concentration that substantially no oxygen exchange occurs between the product and the gas atmosphere.

The invention is based on the use of a material having a composition on the basis of the formula $MeFe_2{}^{2+}+Fe_{16}{}^{3+}O_{27}$ (a so-called ferrous-W-ferrite) which has an approximately 10% higher saturation magnetization than M-ferrite. It has been found that this material, by taking certain precautions, can be sintered to a high density at a temperature of approximately 1200° C. without excessive grain growth.

A difficulty in preparing sintered ferrous-W-ferrite is to obtain a homogeneous $Fe^{2+}$ concentration of (in the ideal case) $2Fe^{2+}$ per $MeFe_{18}O_{27}$. The invention is based further on the recognition (gained during the investigations which led to the invention) that the establishing of the eequilibrium $Fe^{2+}$ concentration by oxygen exchange with the gas atmosphere occurs extremely slowly as soon as the material has been sintered to a certain starting density. Using the low oxygen equilibrium pressure of ferrous-W-ferrite, according to the invention, a compressed powder which has a certain homogeneous $Fe^{2+}$ concentration is subjected to a final sintering step without any substantial oxygen exchange with the gas atmosphere. Although during the heating up to the sintering temperature the (chemically active) powder could easily be oxidized or reduced by the slowly flowing gas atmosphere used, the oxygen equilibrium pressure is so low that by adjusting the oxygen pressure in the gas atmosphere also to a low (constant) value, only very little oxygen exchange takes place (with the gas flow rates used in an open system). Moreover this method results in a cheap mode of preparation. (The alternative is the preparation in a closed system, which in itself is ideal but in practice is difficult to perform).

Furthermore it has surprisingly been found that the addition of a small but effective quantity of iron considerably promotes the sintering properties of the ferrous-W-ferrite and is therefore very important for the manufacture of a highly dense material. The addition may take place prior to, during or after grinding the prefired product. By making this addition after grinding, and mixing it, the duration of grinding is not influenced. It has been found that the addition of quantities of iron of less than 0.05% by weight does not promote or hardly promotes the sintering properties; quantities of more than 0.5% by weight detrimentally influenced the magnetic properties.

Upon heating the mixture of precursors and iron, the added iron gives rise to too high a ferrous content. In order to ensure that the material to be sintered, in spite of the added iron, nevertheless has a correct total ferrous content, an additional heat treatment is preferably used. During this heat treatment a reducing power corresponding to a ferrous content of, for example, 8% by weight, can be diminished to a reducing power corresponding to a ferrous content between 6.6 and 7.6% by weight as a result of oxidation of the powder. These ferrous contents indicate the approximate limits of the existence range of the ferrous-W-ferrite phase.

In order to achieve a comparatively high density ($\approx$95% of the theoretical density), it is not necessary in the method according to the invention to sinter at very high temperatures. Due to the Fe addition it proves to be possible for the sintering temperature to be lower than the sintering temperature which is used in the method described in Netherlands Patent Application No. 7,807,537. The use of such a lower sintering temperature has the advantage that strong grain growth which leads to a decrease of the coercivity can be avoided.

DESCRIPTION OF THE PREFERRED EMBODIMENTS

A few embodiments of the invention will now be described with reference to the following Examples relating to the manufacture of $BaFe_{18}O_{27}$.

An important aspect in the preparation in a permanent magnet (which comprises ferrous-W-ferrite as the predominant phase is that the product to be sintered which as a result of the Fe added in order to achieve a sintered product having a high density has a reducing power corresponding to too high an $Fe^{2+}$ content,) is given a ferrous content which is matched to the stoichiometric ferrous content of the overall mixture by oxidation of the unsintered (or incomplete sintered) product, and that the product is sintered to its final density without any substantial oxygen exchange with the gas atmosphere and without the gas atmosphere being adapted. The oxidation may be carried out at various temperatures and oxygen pressures. As the temperature and as the partial oxygen pressure are increased, the oxidation rate increases considerably so that the oxidation time can be varied considerably.

For example, the $Fe^{2+}$ content of a material having 8.3% by weight of $Fe^{2+}$ could be oxidized, by heating in air at 90° C. for 240 hours, to 7.10% by weight of $Fe^{2+}$. Alternatively the $Fe^{2+}$ content of a material also having 8.3% by weight of $Fe^{2+}$ could be oxidized to 7.21% by weight of $Fe^{2+}$ by heating in air at 140° C. for 5 hours.

A practical upper limit for the temperature of the oxidation step is approximately 1150° C. because above this temperature the material rapidly sinters to a dense product.

EXAMPLE 1

A mixture of $BaCO_3$ and $Fe_2O_3$ was prepared. The mixture had a molar ratio of $1BaCO_3:9Fe_2O_3$ and was then ground in a ball mill in ethanol for 8 hours. (The capacity of the mill was 1000 cm$^3$, and it used grinding balls having diameters of 1.2, 2.0 and 2.5 cm.) The ground product was heated to a temperature of 1400° C. (the heating rate is not critical), was prefired in a nitrogen/oxygen atmosphere containing 2% oxygen by volume at this temperature for 16 hours, and was then quenched in approximately 1 second by pouring it into water. The resulting $BaFe_{18}O_{27}$ ferrite powder contained 7.21% by weight of $Fe^{2+}$ and thus had a composition in the existence range of the ferrous-W-ferrite phase.

Next, 0.5% by weight of $SiO_2$ was added to this ferrite powder so as to inhibit grain growth during sintering. Also 1.8% by weight of $BaFe_2O_4$ was added to compensate for barium loss as a result of barium silicate formation. First the mixture was ground in the above-described ball mill for 4 hours. It was then ground in water in a vibratory mill for 4 hours. (The mill capacity was 3000 cm$^3$, and it used balls of 0.3 cm diameter.) The ground material was then dried at room temperature.

After the addition of 0.4% by weight of iron to the powder, the reducing power corresponded to a ferrous iron content f of 8.4% by weight. This powder was oxidized by heating it in air for 60 hours at a temperature of 115° C. The ferrous iron content of the oxidized powder was 6.82% by weight.

The powder was then disagglomerated by grinding it for 2 hours in an agate mill in acetone. A pellet (1.0$\times$1.2$\times$1.6 cm$^3$) was compressed from the slurry in a field of 640 kA/m and the pellet was compacted at a pressure of 500 bar in a direction perpendicular to the magnetic field. The pellet was sintered in a gas atmosphere of 99.9% by volume of $N_2$+0.1% by volume of $O_2$ by heating to 1220° C. in 10 to 15 minutes, firing for 2 hours at 1220° C., and cooling in 10 to 15 minutes. The properties of this pellet were then measured: 6.91% by weight of $Fe^{2+}$, density 4.86 g/cm$^3$ (91.6% of the Röntgen density), $\tau_s$=7.85 mT cm$^3$g$^{-1}$; $B_r$=447 mT; $H_c$=136 kA/m; $BH_m$=33.6$\times\times$10$^3$ J/m$^3$ (The hysteresis loop was measured in a cube in a direction parallel to the easy axis of magnetization and sheared according to the demagnetization factor $4\pi/3$ of a sphere. This known method may give a small error (up to 4%) in $BH_m$, a considerable error (up to 10%) in $H_c$. The error in $B_r$ is negligible.

EXAMPLE 2

In the manner described in Example 1, a prefired powder with substantially the same composition was prepared starting from $BaCO_3$ and $Fe_2O_3$. 1.8% by weight of $BaFe_2O_4$ and 0.5% by weight of $SiO_2$ were added to this powder and this mixture was subjected to the same grinding treatments and provided with the same iron addition as the mixture of Example 1. This time, however, the subsequent thermal treatment was carried out differently. The pellet was heated to 1150° C. in 1.4 hours in an oxygen-containing nitrogen atmosphere having a partial oxygen pressure of $2\times10^{-6}$ bar. The partial oxygen pressure was then raised to $2\times10^{-3}$ bar. After heating for 30 minutes at 1150° C. at this oxygen pressure, the reducing power was determined to correspond to a ferrous iron content f of 6.9% by weight.

The temperature was then raised to 1220° C. in approximately 10 minutes, the oxygen pressure brought to $5\times10^{-3}$ bar and the material was densely sintered at 1220° C. and an oxygen pressure of $5\times10^{-3}$ bar. After cooling to room temperature in approximately 15 minutes, the following properties were determined for this composition:

6.90% by weight of $Fe^{2+}$, density 5.5 (95% of the Röntgen density),
$\tau_s$=7.93 mT cm$^3$g$^{-1}$; $B_r$=477 mT; $H_c$=127 kA/m, $BH_m$=34.4$\times10^3$ j/m$^3$.

In particular due to their high remanence $B_r$, the magnets obtained in Example 1 and 2 are very suitable for use in loudspeaker systems.

When the same procedure and the same low sintering temperatures as described in Examples 1 and 2 was used, except that the powder to be sintered did not contain added iron, then the density of the sintered body was found to remain below 85% of the Röntgen density.

In addition to the density, the grain size of the final product is also important, notably for the coercivity. The following Table shows the dependence of the density (as a percentage of the Röntgen density), the grain size and the coercive force $H_c$ on the sintering temperature.

TABLE

| Sample No. | Sintering temperature (°C.) | $P_{O_2}$ (bar) | grain size ($H_m$) | d (%) | $H_c$ kA/M |
|---|---|---|---|---|---|
| A | 1140 | $0.95 \times 10^{-3}$ | 1-3 | 87.4 | 135 |
| 3 | 1160 | $1.24 \times 10^{-3}$ | 1-3 | 91.0 | 170 |
| 4 | 1180 | $1.8 \times 10^{-3}$ | 2-5 | 91.0 | 160 |
| 5 | 1220 | $3 \times 10^{-3}$ | 2-8 | 94.5 | 150 |
| 6 | 1250 | $5 \times 10^{-3}$ | 3-8 | 94.9 | 135 |
| B | 1280 | $9 \times 10^{-3}$ | 3-12 | 92.3 | 110 |

The sintering experiments shown in the above Table were performed with pellets obtained in the manner described in Example 1, except that compression took place in a magnetic field of 318 kA/m which was parallel to the direction of compression. From the Table it appears that sintering in the temperature range from 1160° to 1250° C. leads to good properties. (The optimum sintering range proves to be between 1200° and 1220° C.). In order to ensure that no substantial oxygen exchange between the pellet and the atmosphere takes place during sintering, a partial oxygen pressure in the range from $1 \times 10^{-3}$ bar to $1 \times 10^{-2}$ bar should be used. A partial pressure of approximately $1.25 \times 10^{-3}$ bar was used at a sintering temperature of 1160° C. (sample no. 3) which was raised gradually to approximately $5 \times 10^{-3}$ bar at a sintering temperature of 1250° C. (sample no. 6).

The reducing power of the powders used was determined by means of the cerous-ceric method.

There exist several possibilities for adjusting the required partial oxygen pressures as a function of the temperature. For example, the required quantities of oxygen can be mixed with an inert gas. Nitrogen is a suitable inert gas in many cases. In many cases, in particular at small partial oxygen pressures, carbon dioxide may also be mixed.

What is claimed is:

1. A method of manufacturing an anisotropic oxidic permanent magnet having a hexagonal crystal structure and uniaxial anisotropy, said method comprising the steps of:
   providing one or more first compounds from the group consisting of iron oxide and iron compounds which form iron oxide upon heating;
   providing one or more second compounds from the group consisting of barium oxide, strontium oxide, lead oxide, and compounds of barium, strontium, and lead which form the respective oxides upon heating and optionally calcium partially replacing, the barium, strontium, and lead
   mixing the first and second compounds in proportions which will form a magnet having a W-ferrite phase having a composition defined by the formula Me-$Fe_2^{2+}+Fe_{16}^{3+}+O_{27}$, where Me is a metal from the second compound;
   prefiring the mixture at a prefiring temperature in an oxygen-containing atmosphere having a partial oxygen pressure, the partial oxygen pressure and prefiring temperature being chosen to form the desired ferrite phase, said prefiring producing a prefired product having a W-ferrite phase of said formulation;
   grinding the prefired product;
   shaping the ground product in the presence of a magnetic field; and
   sintering the shaped product at a temperature from 1160° to 1250° C. in a gas atmosphere having an oxygen concentration such that substantially no oxygen exchange occurs between the product and the gas atmosphere;
   wherein a quantity of iron of from 0.05 to 0.5% by weight is added to the prefired product and the iron containing prefired product is oxidized prior to sintering at a temperature of at most 1150° C. so that the product to be sintered has a ferrous content corresponding to that of said W-ferrite phase.

2. A method as claimed in claim 1, characterized in that the product is sintered in an atmosphere having a partial oxygen pressure in the range from $1 \times 10^{-3}$ to $1 \times 10^{-2}$ atmospheres.

3. A method as claimed in claim 1, characterized in that the iron is added to the prefired product after the grinding step.

4. A method as claimed in claim 1, characterized in that the shaped product to be sintered has a ferrous content between 6.6 and 7.6% by weight.

* * * * *